United States Patent
Stepp, III et al.

(10) Patent No.: US 6,748,524 B1
(45) Date of Patent: Jun. 8, 2004

(54) DISPLAY AND RECORDATION OF NON-VOLATILE MEMORY CHANGES

(75) Inventors: George T. Stepp, III, Sioux City, IA (US); Paul R. Kayl, McCook Lake, SD (US)

(73) Assignee: Gateway, Inc., Poway, CA (US)

( * ) Notice: Subject to any disclaimer, the term of this patent is extended or adjusted under 35 U.S.C. 154(b) by 1244 days.

(21) Appl. No.: 08/848,374

(22) Filed: Apr. 30, 1997

(51) Int. Cl.[7] .............................................. G06F 15/177
(52) U.S. Cl. ............................................. 713/1; 713/100
(58) Field of Search ................................. 395/651, 652, 395/653

(56) References Cited

U.S. PATENT DOCUMENTS

| | | | |
|---|---|---|---|
| 5,388,267 A | | 2/1995 | Chan et al. .................. 395/700 |
| 5,410,699 A | | 4/1995 | Bealkowski et al. ......... 395/700 |
| 5,479,639 A | | 12/1995 | Ewertz et al. ............... 395/430 |
| 5,497,490 A | * | 3/1996 | Harada et al. ............... 395/700 |
| 5,659,747 A | * | 8/1997 | Nakajima .................... 395/651 |
| 5,740,431 A | * | 4/1998 | Rail ............................ 395/616 |
| 5,768,568 A | * | 6/1998 | Inui et al. .................... 395/500 |

OTHER PUBLICATIONS

ASUS, PVI–486AP4 User's Manual, Aug. 1994, pp. 1–1 through 1–13 and 3–1 through 3–35.*

"BIOS: Phoenix enhances PhoenixBIOS 4.0 to improve PC flexibilty, ease–of–use & system management capabilities", *EDGE: Work–Group Computing Report*, vol. 6, No. 288, 2 pages (Nov. 20, 1995).

"New BIOS: Phoenix Technologies announces first customer shipments of Release 5 of PhoenixBIOS 4.0", *EDGE: Work–Group Computing Report*, vol. 6, No. 257, 3 pages (Apr. 24, 1995).

Curran, L.J., "Tiny BIOS takes on an expanding role", *Electronic Business Today*, vol. 22, No. 3, 6 pages (Mar. 1996).

Messmer, H., "The Indispensable PC Hardware Book", 2nd Edition, Addison–Wesley Publishers Ltd., pp. 636–649 (1995).

* cited by examiner

*Primary Examiner*—Dennis M. Butler
(74) *Attorney, Agent, or Firm*—Scott Charles Richardson; Rodney Lacy; Schwegman, Lundberg, Woessner & Kluth

(57) ABSTRACT

The display and recordation of non-volatile memory (NVM) changes is disclosed. In one embodiment a computer comprises a central-processing unit (CPU), a storage device, a NVM such as a CMOS, and a program. The NVM stores a plurality of configuration settings. The program permits changes to be made to the configuration settings, and maintains a history file of changes previously made to the configuration settings.

10 Claims, 5 Drawing Sheets

DISPLAY AND RECORDATION OF NON-VOLATILE MEMORY CHANGES

FIELD OF THE INVENTION

This invention relates generally to a non-volatile memory of a computer, and more particularly to the display and recordation of changes made to such a memory.

BACKGROUND OF THE INVENTION

Typically, personal computers include a special type of chip that combines a real-time clock (RTC) with at least sixty-four bytes (including the clock date) of non-volatile RAM (NVRAM) memory. This chip is often referred to as the "CMOS chip" or "CMOS RAM," since the type chip of used is typically produced using a CMOS (Complimentary Metal Oxide Semiconductor) process. CMOS design chips are known for very low power consumption, and this special RTC/NVRAM chip is designed to run off a battery for several-years.

The RTC/NVRAM chip typically includes a real-time clock. The clock permits software running on the computer to read the date and the time, and so that the date and the time will be preserved even though the system is powered off or unplugged. The NVRAM portion of the chip is designed to store the basic system configuration, including the amount of memory installed, types of floppy and hard disk drives, and other information, via a number of registers. This information can thus be read every time the computer is powered on. The chip is therefore powered by an external or integrated battery.

Most computers come with only a rudimentary program to make changes to the settings stored in the registers on the CMOS chip, however. Typically, for example, the user has to press F1 while the computer is booting to access the CMOS set-up program. Once the user has made changes to the CMOS registers, exiting the program causes the changes to be stored in the CMOS chip, such that the previous settings are erased.

Therefore, there are a number of drawbacks to the current approach to making CMOS register changes. The program does not keep track of previous changes that has been made. This means that if a mistake is made when making changes, there is no way of easily going back to previous settings. This is troublesome especially where a technician attempting to repair the machine needs to restore the CMOS registers to their original factory presets. Known prior art software only permits the recordation of past setting changes for the operating system settings, not CMOS settings.

There are other drawbacks to the current approach to making CMOS register changes. Upon start-up the program does not verify whether the CMOS registers have been inadvertently changed since the last time the program was run.

There is a need, therefore, for a CMOS settings program that keeps track of previous changes that have been made to the CMOS registers. There is a need for such a program that asks the user for confirmation prior to making the changes to the CMOS chip. Finally, there is a need for a program that verifies whether the CMOS registers have been inadvertently changed since the last time the program was run.

SUMMARY OF THE INVENTION

The present invention relates to the display and recordation of changes made to a non-volatile memory of a computer. In one embodiment of the invention, a computer comprises a central-processing unit (CPU), a storage device operatively coupled to the CPU, a non-volatile memory (NVM) operatively coupled to the storage device, and a computer program. The NVM is of any type, such as an electrically erasable programmable read-only memory (EEPROM). The NVM stores a plurality of configuration settings. The computer program is stored on the storage device and executed by the CPU, and permits changes to be made to the configuration settings and to maintain a history file of changes previously made to the configuration settings. The computer program maintains both changes initiated by the user, and those made by the operating system or other programs running on the computer.

In another embodiment of the invention, a computerized system comprises the NVM and two components, a modification component and a recordation component. The modification component permits changes to be made to the configuration settings of the NVM, while the recordation component maintains a history file of all the changes previously made to the configuration settings. In a particular embodiment, the modification component permits changing the configuration settings to one of the history file of changes, as maintained by the recordation component. In other embodiments, a confirmation component verifies that the changes to be made are correct, and an initiation component inquires whether the configuration settings should be reset to the changes most recently made upon a mismatch of the configuration settings with the changes most recently made.

In this manner, the present invention provides for a number of advantages. The program of the present invention keeps track of previous changes that have been made to the NVM configuration settings. The program in one embodiment further asks the user for confirmation prior to making the changes to the NVM chip. Finally, the program verifies whether the configuration settings have been inadvertently changed since the last time the program was run, before permitting other changes to be made.

Other embodiments of the invention include a computer-readable storage medium storing a computer program including means for changing a plurality of configuration settings and means for maintaining a history file of changes, and also a method for maintaining a plurality of configuration settings stored on a NVM of a computer. Still other and further aspects, advantages, and embodiments of the present invention will become apparent in the following description, and by referencing to the drawings.

DETAILED DESCRIPTION OF THE INVENTION

Figure 1:
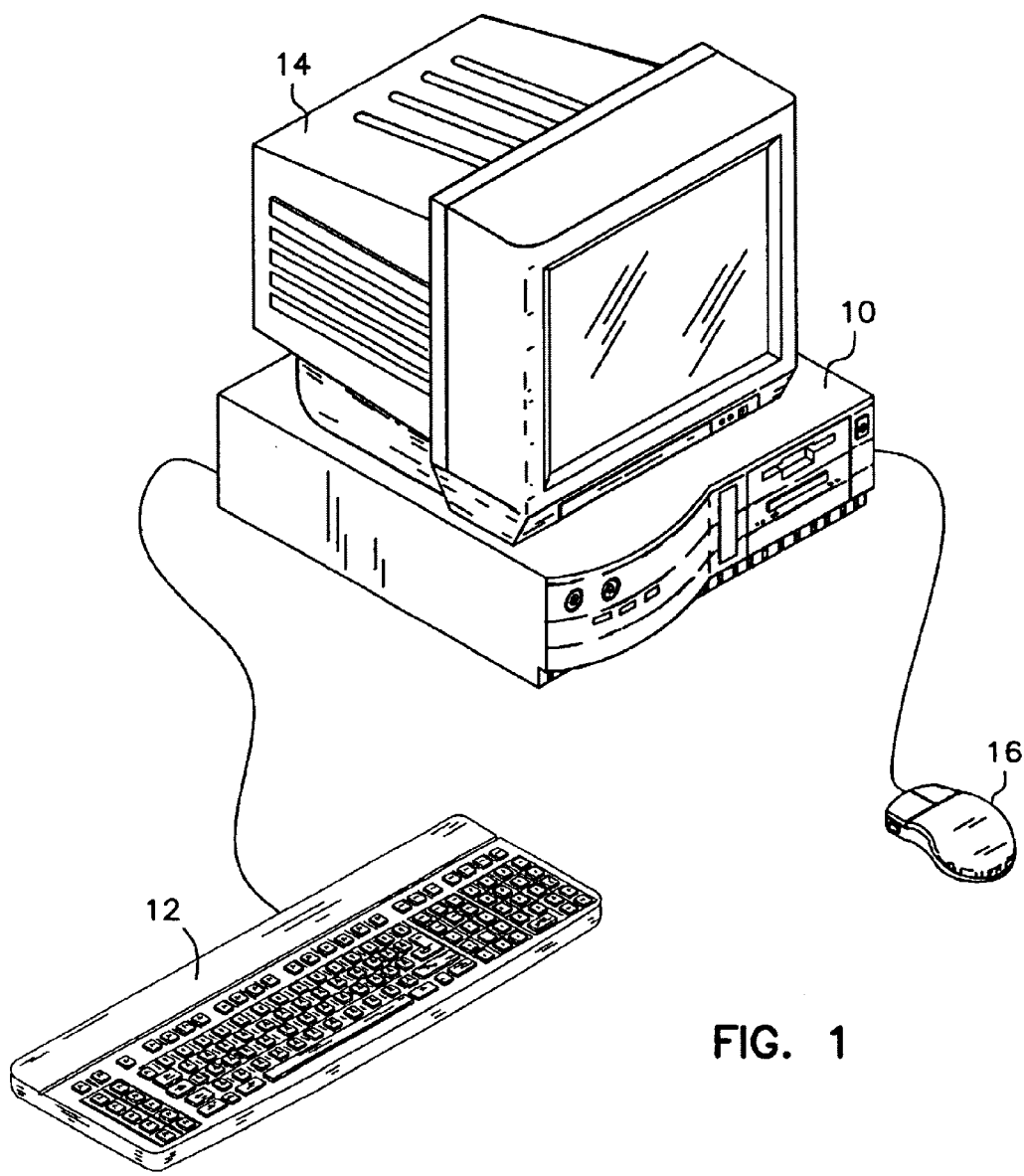
FIG. 1 is a diagram of a computer in conjunction with which an embodiment of the present invention may be implemented.

The present invention relates to the display and recordation of changes made to a non-volatile memory of a computer. A diagram of a typical computer in conjunction with which the present invention can be used is shown in FIG. 1. Computer 10 usually is operatively coupled to keyboard 12, display device 14 and pointing device 16. Not shown is that computer 10 typically includes a fixed media storage device such as a hard disk drive, and a removable media storage device such as a floppy disk drive. Also not shown is that computer 10 typically includes a memory (RAM) (in one embodiment, sixteen megabytes), read-only memory (ROM), and a central-processing unit (CPU) (in one embodiment, an Intel Pentium processor). As shown, computer 10 is a desktop computer, such as a Gateway 2000 personal computer, although the invention is not so limited. For example, computer 10 could also be a laptop computer such as a Gateway 2000 Solo.

Computer 10 typically has an operating system running thereon that coordinates activity by other computer programs, especially in conjunction with keyboard 12, display device 14, and pointing device 16. One such operating system is MS-DOS; another is Microsoft Windows 95. Keyboard 12 can be any of a number of different keyboards, and the invention is not particularly limited. Display device 14 can be any of a number of different devices, such as a computer monitor employing a cathode ray tube (CRT). Pointing device 16 as shown in FIG. 1 is a mouse, although the invention is not so limited. For example, pointing device 16 may also be a trackball, or a touch pad.

Figure 2:
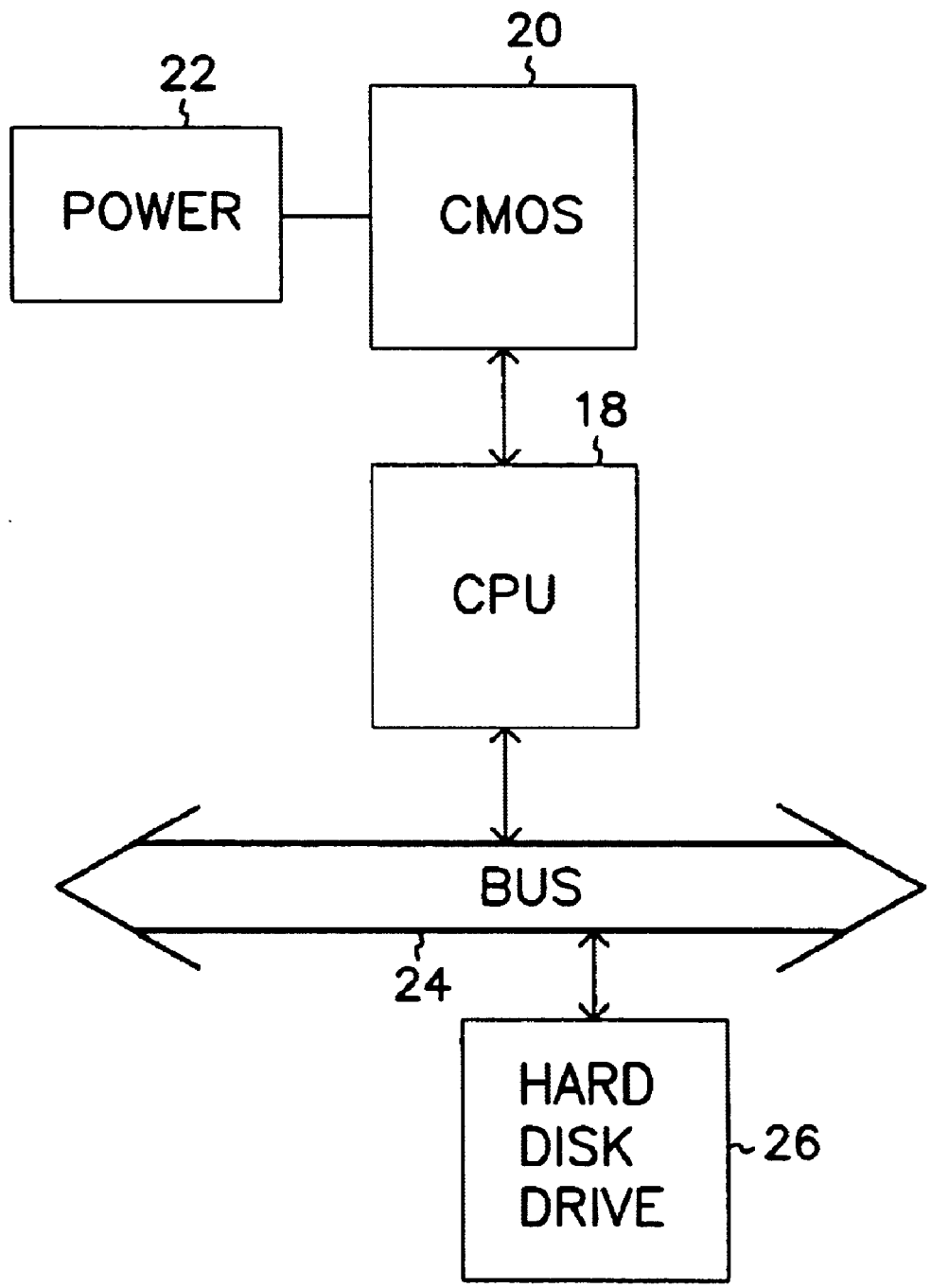
FIG. 2 is a block diagram of a partial computer architecture in conjunction with which an embodiment of the present invention may be implemented.

Referring now to FIG. 2, a block diagram of a partial system architecture in conjunction with which an embodiment of the present invention may be used is shown. Those of ordinary skill in the art will recognize that FIG. 2 is not a block diagram of a complete system architecture; rather, only those parts of a computer architecture necessary for an enabling disclosure of the present invention have been shown. CPU 18 is operatively coupled to CMOS 20, which is itself operatively coupled to battery 22. As has been described, CPU 18 is in one embodiment an Intel Pentium processor.

CMOS 20 is one type of non-volatile memory (NVM); the invention is not, however, particularly limited to NVM that is CMOS. In one embodiment, CMOS 20 is a Motorola 146818 chip that requires separate battery 22 for power. However, as those of ordinary skill within the art will recognize, the invention is not particularly limited. For example, chips available from Dallas Semiconductor and Benchmarq combine both CMOS 20 and battery 22 in one integrated chip. Furthermore, chips available from Hewlett-Packard include a capacitor that is automatically recharged any time the system is plugged in, and therefore does not need a battery. In the case where CMOS 20 is a Motorola 146818 chip, battery 22 is usually 3.6 volts, 4.5 volts, or 6 volts, and is typically either a lithium or alkaline battery. Non-CMOS NVM includes other non-volatile random-access memory (NVRAM), erasable programmable read-only memory (EPROM), and electrically erasable programmable read-only memory (EEPROM).

CPU 18 is also operatively coupled to bus 24, which enables CPU 18 to communicate with other peripherals, such as hard disk drive 26. Hard disk drive 26, as those of ordinary skill in the art recognize, does not couple directly to bus 24, but rather couples via an intermediary controller card (not shown in FIG. 2). Hard disk drive 26 is one typed of fixed media storage device, and as has been described, the invention is not so particularly limited. In one embodiment, hard disk drive 26 is a drive having 9.0 gigabytes of capacity, such as those manufactured by Connor, Western Digital, and Seagate.

The program of the present invention in one embodiment is stored on hard disk drive 26, and is activated by a hot key, such as F1, CONTROL-S, F2, etc., pressed by the user during start-up. This causes CPU 18 to execute the program. As described hereafter, the program reads the configuration settings of CMOS 20 to permit a user of the computer to make changes to the settings, and maintains a history file of changes previously made to the configuration settings. CPU 18 makes uses of random-access-memory (RAM) (not shown in FIG. 2) as needed during the execution of the program, as those of ordinary skill in the art understand. The history file maintained by the program is stored on hard disk drive 26.

Figure 3:
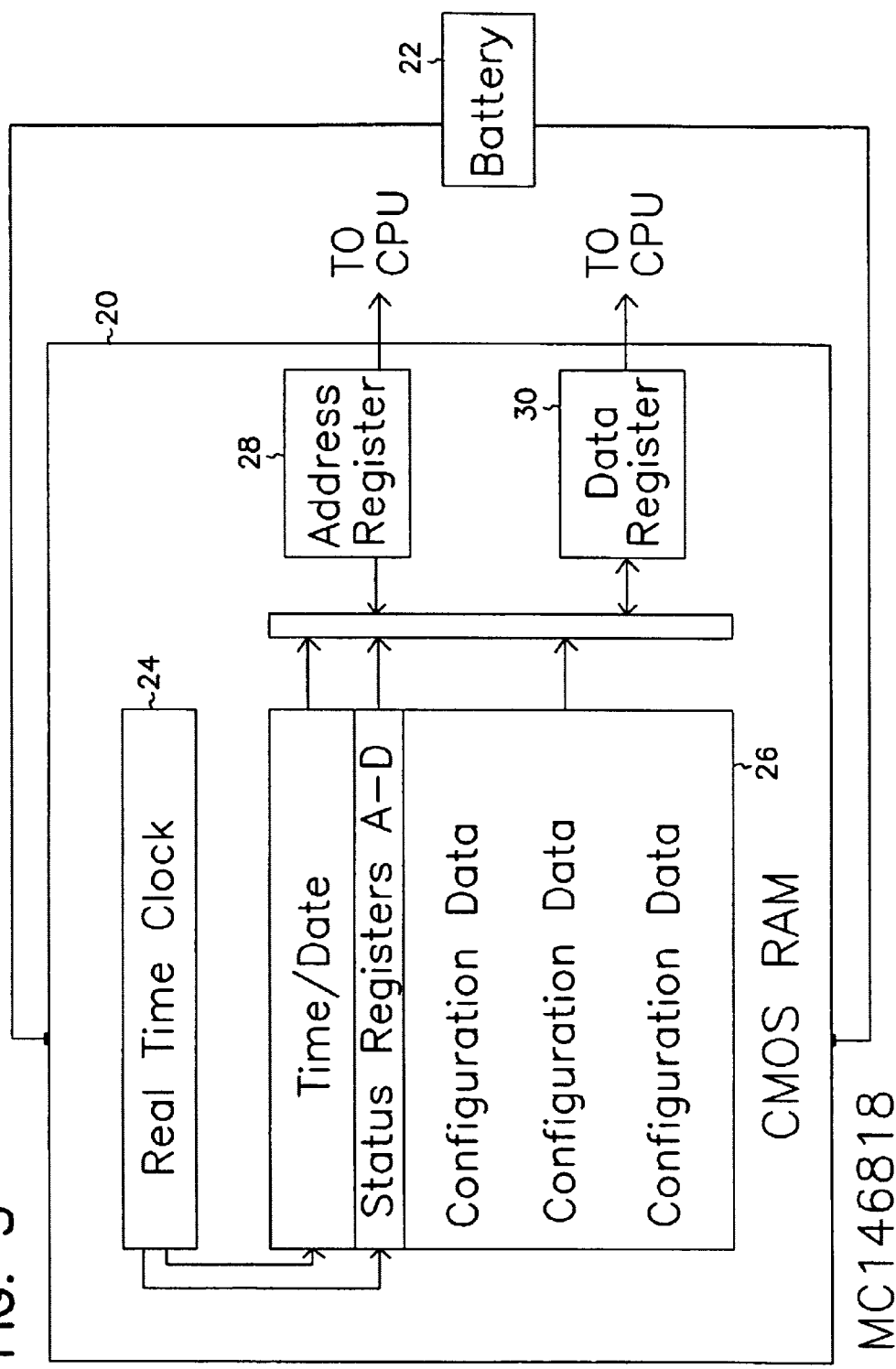
FIG. 3 is a block diagram showing in more detail the CMOS chip and battery of FIG. 2.

Referring now to FIG. 3, CMOS 20 and battery 22 of FIG. 2 are shown in a block diagram of more detail. CMOS 20 includes real-time clock 24, CMOS RAM 26, address register 28 and data register 30. CMOS RAM 26, in the case where CMOS 20 is an MC146818, usually has 64 individually accessible bytes of memory. CMOS RAM 26 is itself divided into specific areas for time and date information, time and date status registers A–D, and configuration data. The time and date information and status registers A–D usually take up the first fourteen bytes of memory (bytes 0–13), while the remaining fifty bytes (bytes 14–63), hold information concerning the PC's configuration. In one embodiment, the configuration settings stored in these last fifty bytes are as follows:

| Byte | Contents |
| --- | --- |
| 14 | diagnosis status |
| 15 | shutdown status |
| 16 | type of floppy drives |
| 17 | reserved |
| 18 | type of hard disk drives |
| 19 | reserved |
| 20 | device byte |
| 21 | base memory (low byte) |
| 22 | base memory (high byte) |
| 23 | extended memory (low byte) according to SETUP |
| 24 | extended memory (high byte) according to SETUP |
| 25 | extension byte 1st hard disk |
| 26 | extension byte 2nd hard disk |
| 27–31 | reserved |
| 32–39 | parameter hard disk type |
| 40–45 | reserved |
| 46 | check sum (low byte) |
| 47 | check sum (high byte) |
| 48 | extended memory (low byte) according to POST |
| 49 | extended memory (high byte) according to POST |
| 50 | century |
| 51 | setup information |
| 52 | reserved |
| 53–60 | parameter hard disk type |
| 61–63 | reserved |

Those of ordinary skill within the art will recognize these configuration settings stored in the last fifty bytes of CMOS RAM. The specific manner in which each byte or group of bytes holds its particular configuration settings information is also well known to those of ordinary skill within the art. Its specific disclosure herein is not required for the enablement of the invention. Such information is commonly found in reference materials on the subject matter, such as chapter 26.3 of *The Indispensable PC Hardware Book,* by Hans-Peter Messmer (2d edition, 1995, ISBN 0-201-87697-3), which is herein incorporated by reference.

Thus, for CPU 18 to store information to the configuration settings bytes of CMOS RAM 26, CPU 18 inserts address information in address register 18 (which corresponds to specific bytes of CMOS RAM 26, for example, one or more of bytes 14–63). If CPU 18 is performing a read function, CMOS RAM 26 returns the information held at that address at data register 30. If CPU 18 is performing a write function, it places the new information for the configuration settings at that address in register 30, and CMOS RAM 26 then stores this information at the address specified. Reading and writing configuration settings to and from CMOS RAM 26 via CPU 18 is also well understood by those of ordinary skill within the art.

Figure 4A:
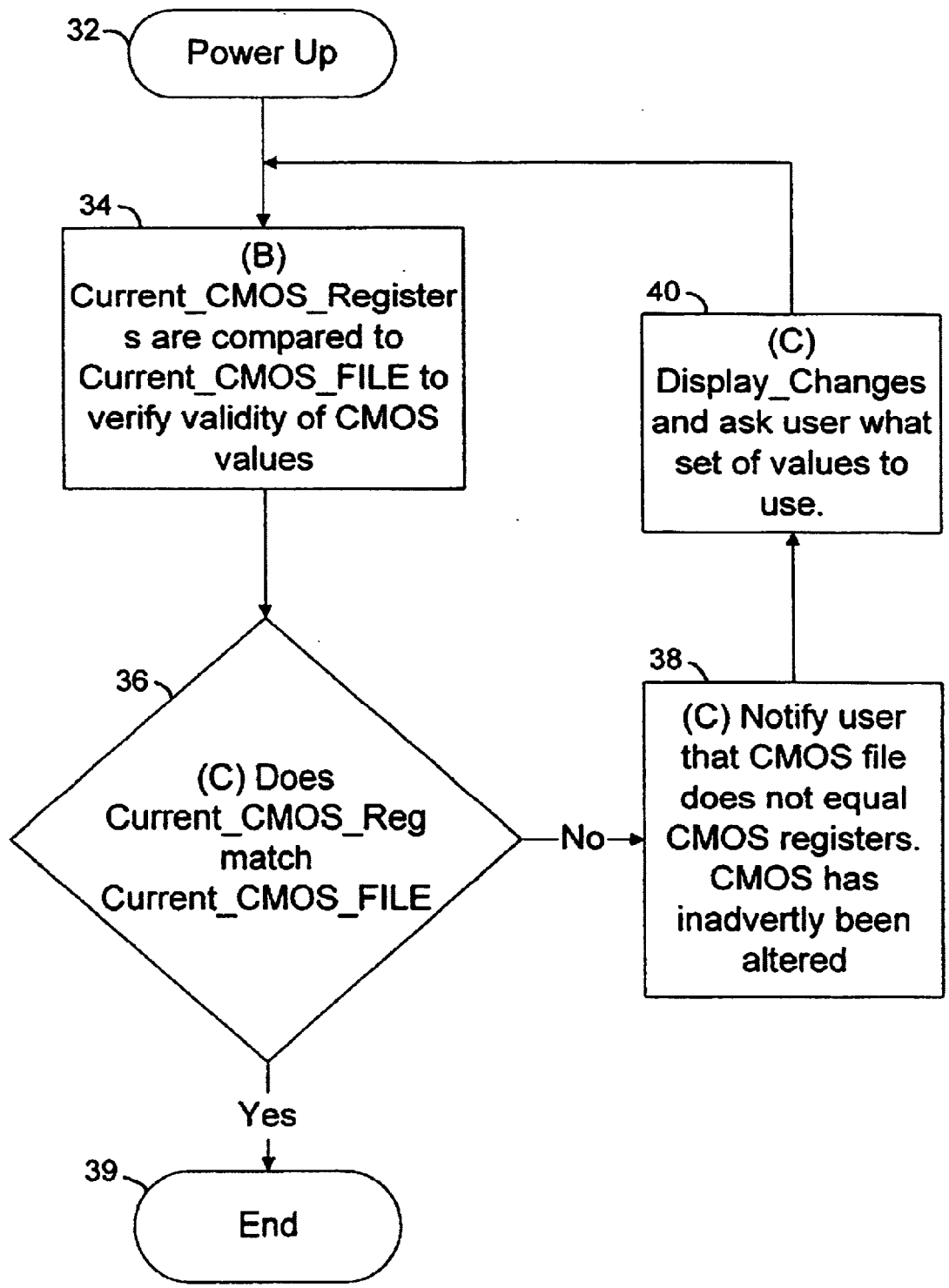
FIG. 4(a) is a flow chart of an initiation component of a computer program according to one embodiment of the invention.

Referring now to FIG. 4(a), a flow chart of an initiation component of a computer program according to one embodiment of the invention is shown. The initiation component is executed as part of the start-up protocol of the computer—i.e., when a user of the computer has first turned the computer on, or when the user has re-booted the computer. Control proceeds from step 32 to step 34.

In step 34, the current CMOS registers are compared to the information in the file current_CMOS_file, which is stored on the hard disk drive (i.e., hard disk drive 26 of FIG. 2). The current CMOS registers are, for example, bytes 14–63 of CMOS RAM 26 of CMOS 20 of FIG. 3. As has been explained, these registers hold the configuration settings for the computer. The file current_CMOS_file is a redundant storage of the current CMOS registers, as captured and saved at some other earlier time (i.e., an earlier running of the CMOS set-up program of the present invention, or as placed on the hard drive at the factory, prior to shipping to the user); that is, the file contains the changes made most recently to the configuration settings. Typically, the file should match the contents of the current CMOS registers. However, if the CMOS registers have been altered for any reason (i.e., the battery preserving the contents of the CMOS registers having been run down, etc.), they will not match.

Control proceeds to step 36. If there is a mismatch between the current CMOS registers and the file current_CMOS_file, control proceeds from step 36 to step 38. In step 38, the program notifies the user that the CMOS registers have been altered, and control proceeds to step 40. In step 40, the program displays the settings that should have been in the registers (i.e., as are held in the file current_CMOS_file), as well as the settings that the program actually found at the registers, and asks the users which set of values to use. That is, the program asks the user whether the configuration settings of the registers should be reset to the values found in the file current_CMOS_file. Upon the user making a selection, the program writes the chosen set of values to both the CMOS registers and the file current_CMOS_file, and control proceeds back to step 34. Once there is a match between the current CMOS registers and the file current_CMOS_file, control proceeds from step 36 to step 39, and the initiation component is finished.

If a program makes changes to the configuration settings in the NVM (i.e., the current CMOS registers), these changes are also saved to the file current_CMOS_file. This is done so that a user is not queried as has been described in the case where a program running on the computer makes changes to the configuration settings. The query process of FIG. 4(a) is instead used in the case where for whatever reason the current CMOS registers are lost (e.g., due to power loss to the NVM), and thus the registers do not match those settings stored in the file current_CMOS_file.

Figure 4B:
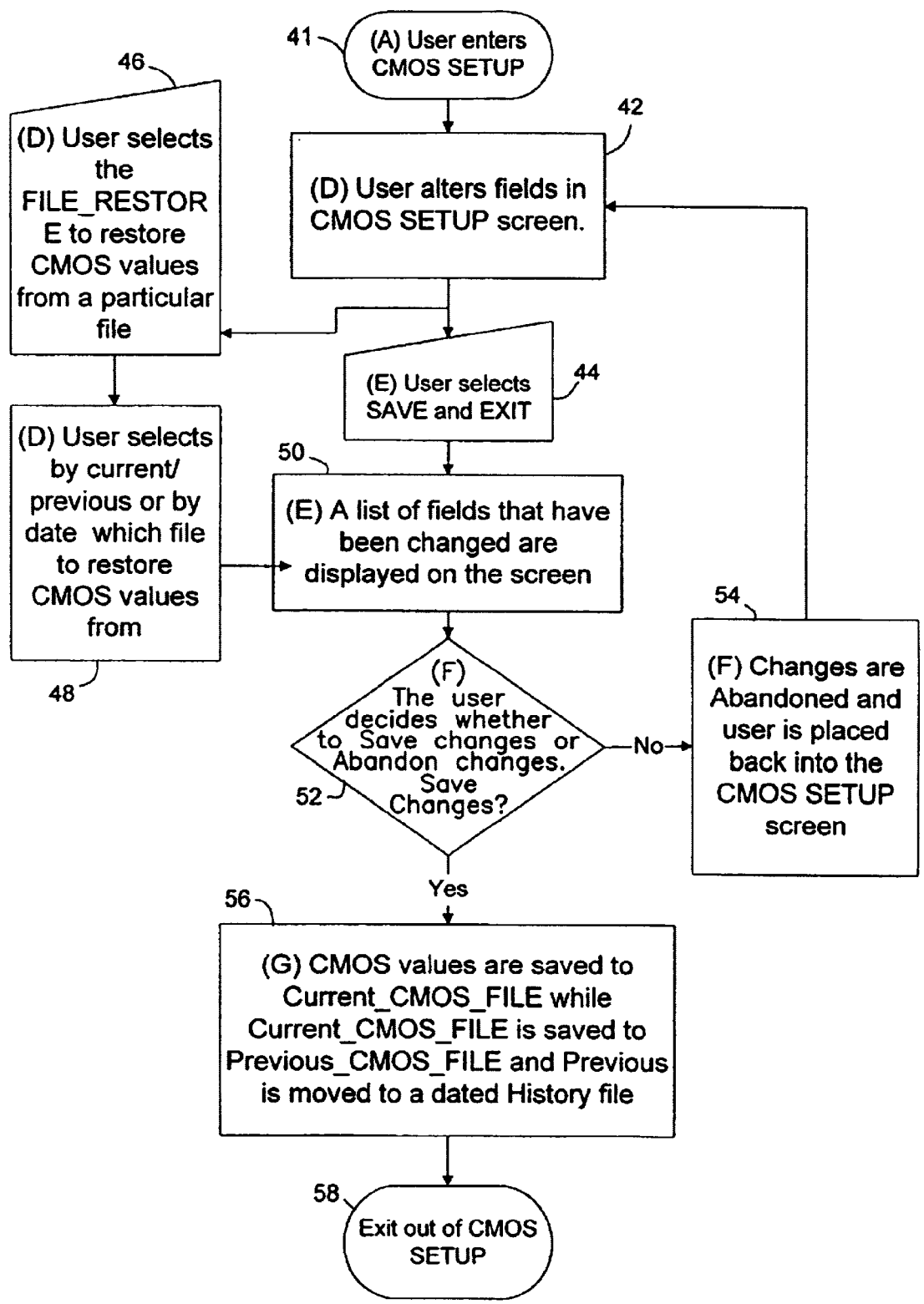
FIG. 4(b) is a flow chart of a computer program permitting a user of the computer to make, confirm and record changes to the configuration settings of the computer, according to one embodiment of the invention.

Referring now to FIG. 4(b), a flow chart of a computer program permitting a user to make, confirm, and save changes to the configuration settings according to one embodiment of the invention is shown. Steps 42, 44, 46 and 48 make up a modification component of the computer program. The modification component permits a user of the computer to make changes to the configuration settings. In step 41, a user enters the CMOS set-up program of the present invention via a hot key, as has been already discussed. Control proceeds to step 42. In step 42, the program displays the current registers of the CMOS, and permits the user to make any changes to the configuration settings stored in the registers.

From step 42, the user has the option to make manual changes and then proceed to save the changes, and also has the option to restore the registers to a previously saved set of configuration settings. In the former instance, control proceeds to step 44, in which step the user selects the save and exit option. In the latter instance, control proceeds to step 46, in which step the user selects the file restore option. Control proceeds to step 48, which permits a user to select the current CMOS registers as stored in the file current_CMOS_file, or the previous values for the CMOS registers, as stored in the file previous_CMOS_file as saved on the hard disk drive.

In a further embodiment, at step 48 the user is permitted to also select one of a plurality of different presets of configuration settings, as stored in another file on the hard disk drive. In a still further embodiment, at step 48 the user is permitted to also select one of a history file of previous changes made to the configuration settings (as will be discussed hereinafter), as stored in another file on the hard disk drive. The user is able to select among the settings saved on the history file by date.

From both step 44 and step 48, control proceeds to step 50, in which the changes made to the configuration settings (via manual changing at steps 42 and 44, or via loading a set of configuration settings saved in a file on the hard drive at step 48) are displayed on the screen for confirmation purposes. Steps 50, 52 and 54 make up the confirmation component of the program of the present invention. Control proceeds from step 50 to step 52, in which step the user determines whether to save the changes made to the configuration settings of the CMOS registers, or abandon the changes (i.e., undo the changes that have been made). If the user in step 52 decides to abandon the changes, control proceeds to step 54. At step 54, the changes are abandoned, and the settings from the current_CMOS_registers file are redisplayed on the screen. Control proceeds to step 42, and the user is again permitted opportunity to alter the settings.

Once the user has agreed to the changes in step 52, control proceeds to step 56. Step 56 is the recordation component of the program of the present invention, which maintains a history file of changes previously made to the configuration settings. At step 56, the program adds the configuration settings in the file previous_CMOS_file, which is stored on the hard drive, to a history file also on the hard drive. The history file includes the dates and configuration settings for all the changes that have ever been made to the CMOS registers by the program of the present invention. In one embodiment, the history file records the historical settings in relation to a baseline plurality of configuration presets, as set at the factory. Furthermore, the program saves the settings in the current_CMOS_file file to the previous CMOS_file_ file, and then saves the settings as currently changed to both the actual CMOS registers of the CMOS chip, as well as to the file current_CMOS_file. Control proceeds to step 58, and the program ends at that step.

Thus, the program as herein described saves a number of files on the hard disk drive regarding the configuration settings of the CMOS registers. The current configuration settings are saved in the file current_CMOS_file. The configuration settings that were previously in the CMOS registers are saved in the file previous_CMOS_file. Finally, a historical record of all the changes ever made to the CMOS registers is kept in the history file, by date, and in one embodiment, in relation to a baseline set of presets. When a new set of configuration settings is made, the new set is saved to the current_CMOS_file, the old contents of which are saved to the file previous_CMOS_file, the old contents of which are added to the history file.

Those of ordinary skill in the art will readily appreciate that many changes and modifications to the above drawings and description can be made without departure from the spirit or scope of the following claims. For example, the program of the present invention has been described largely to apply to a CMOS chip having fifty bytes for configuration settings. However, modification of the present invention to apply to any type of NVM chip having any number of bytes of configuration settings is within the scope of the following claims.

We claim:

1. A computer comprising:
    a central-processing unit;
    a storage device operatively coupled to the central-processing unit;
    a non-volatile memory operatively coupled to the central-processing unit and storing a plurality of configuration settings; and,
    a program stored on the storage device and executed by the central-processing unit to permit changes to be made to the configuration settings and to maintain a chronologically ordered history file of changes previously made to the configuration settings and to allow user selection of one of the plurality of configuration settings.

2. The computer of claim 1, wherein the history file relates to a baseline plurality of configuration settings.

3. The computer of claim 1, wherein the program reverses changes made to the configuration settings.

4. The computer of claim 1, wherein the non-volatile memory is a CMOS memory.

5. A computerized system comprising:
    a non-volatile memory storing a plurality of configuration settings;
    a modification component operatively coupled to the memory to permit changes to be made to the configuration settings;
    a recordation component operatively coupled to the memory to maintain a chronologically ordered history file of changes previously made to the configuration settings;
    an initiation component operatively coupled to the memory to compare the configuration settings with changes most recently made to the configuration settings;
    wherein the initiation component further queries whether the configuration settings should be reset to the changes most recently made upon a mismatch of the configuration settings with the changes most recently made.

6. A computerized system comprising:
    a non-volatile memory storing a plurality of configuration settings;
    a modification component operatively coupled to the memory to permit changes to be made to the configuration settings;
    a recordation component operatively coupled to the memory to maintain a chronologically ordered history file of changes previously made to the configuration settings;
    wherein the modification component permits changing the configuration settings to one of a plurality of different presets of configuration settings.

7. A computer-readable storage medium having a computer program executable on a suitably configured computer, the computer having a non-volatile memory, the computer program comprising:
    means for changing a plurality of configuration settings stored on the memory;
    means for maintaining a chronologically ordered history file of changes previously made to the configuration settings;
    means for comparing the configuration settings stored on the memory to changes most recently made to the configuration settings; and,
    means for changing the configuration settings stored on the memory to the changes most recently made upon a mismatch of the configuration settings with the changes most recently made.

8. A method for maintaining a plurality of configuration settings stored on a non-volatile memory of a computer, comprising the steps of
    querying a user for new configuration settings;
    recording the configuration settings stored on the memory;
    changing the configuration settings stored on the memory to the new configuration settings;
    wherein the step of querying a user for new configuration settings first performs the steps of:
        comparing the configuration settings stored on the memory to a current configuration file of configuration settings; and,
        querying a user whether the configuration settings stored on the memory should be reset to the configuration settings of the current configuration file.

9. A method for maintaining a plurality of configuration settings stored on a non-volatile memory of a computer, comprising the steps of
    querying a user for new configuration settings;
    recording the configuration settings stored on the memory;
    changing the configuration settings stored on the memory to the new configuration settings;
    wherein the step of querying a user for new configuration settings comprises the step of permitting the user to select one of a plurality of different presets of configuration settings as the new configuration settings.

10. A method for maintaining a plurality of configuration settings stored on a non-volatile memory of a computer, comprising the steps of
    querying a user for new configuration settings;
    recording the configuration settings stored on the memory;
    changing the configuration settings stored on the memory to the new configuration settings;
    wherein the step of querying a user for new configuration settings comprises the step of permitting the user to select one of a history file of changes previously made to the configuration settings as the new configuration settings.

* * * * *